US008761817B2

(12) United States Patent
Chen et al.

(10) Patent No.: US 8,761,817 B2
(45) Date of Patent: Jun. 24, 2014

(54) SHORT MESSAGING SERVICE DELIVERY ARCHITECTURE IN HYBRID LTE/CDMA/GSM NETWORKS

(75) Inventors: Xuming Chen, San Ramon, CA (US); Loc B. Vo, Pleasant Hill, CA (US); Kwai Y. Lee, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1123 days.

(21) Appl. No.: 12/564,329

(22) Filed: Sep. 22, 2009

(65) Prior Publication Data

US 2011/0070902 A1   Mar. 24, 2011

(51) Int. Cl.
*H04W 4/12*   (2009.01)
(52) U.S. Cl.
USPC .......................................... 455/466; 370/252
(58) Field of Classification Search
USPC ........ 455/422.1, 424, 466, 465, 435.1, 435.2; 370/252, 352, 465
See application file for complete search history.

(56) References Cited

U.S. PATENT DOCUMENTS

| 2002/0167906 | A1* | 11/2002 | La Porta et al. ................ 370/252 |
| 2003/0224811 | A1* | 12/2003 | Jain et al. ...................... 455/466 |
| 2005/0170855 | A1* | 8/2005 | Comer et al. .................. 455/466 |
| 2006/0046752 | A1* | 3/2006 | Kalavade ...................... 455/466 |
| 2007/0254650 | A1* | 11/2007 | Noguchi et al. ............ 455/435.1 |

* cited by examiner

*Primary Examiner* — Myron K Wyche

(57) ABSTRACT

A method includes a network device receiving a request from a user, to deliver a short messaging service (SMS) message, to another user, where the other user is roaming; sending, to a first device, a user registration query; receiving, from the first device and by the network device, a user registration response, where the user registration response indicates whether the other user, in which the SMS message is to be delivered, is registered with zero networks, one network, or two networks; forwarding, by the network device, the SMS message associated with the request, via at least one of the one network or the two networks, when the user registration response indicates that the other user is registered with at least one of the one network or the two networks; and sending to a second device, by the network device, another user registration query, when the user registration response indicates that the other user is registered with zero networks.

20 Claims, 13 Drawing Sheets

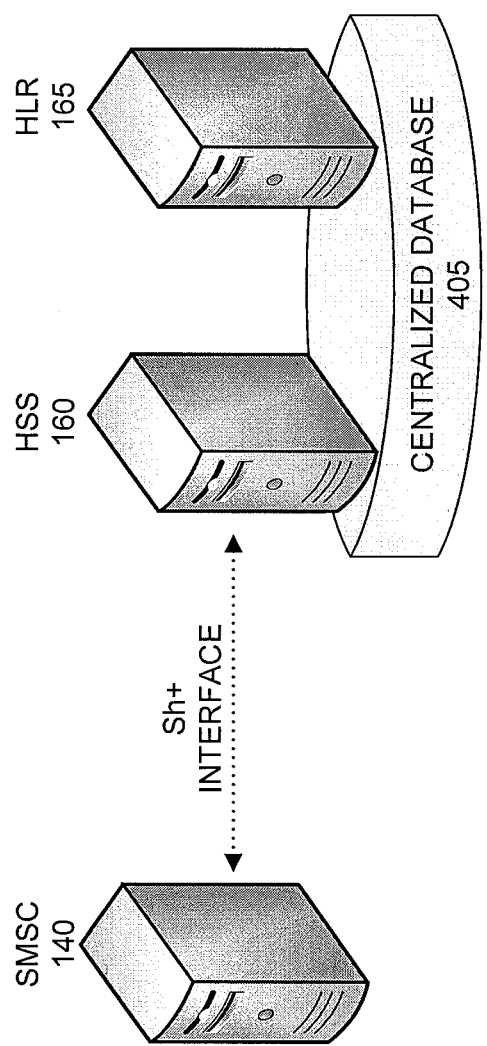

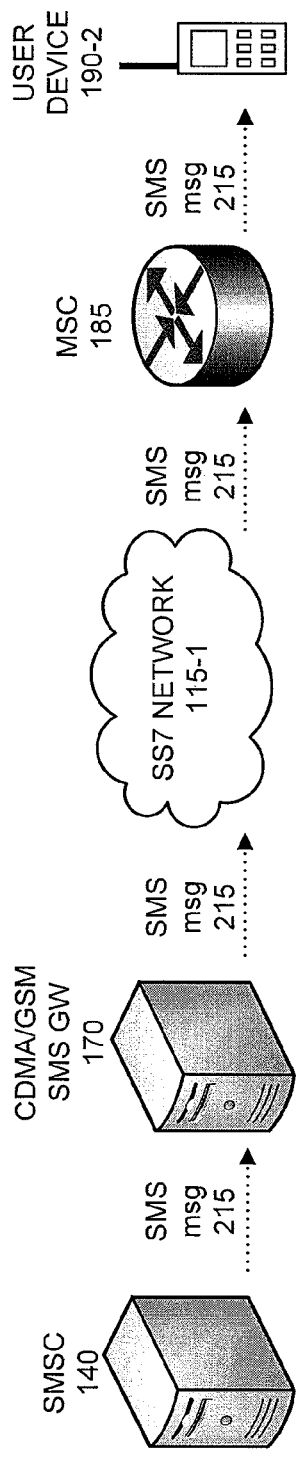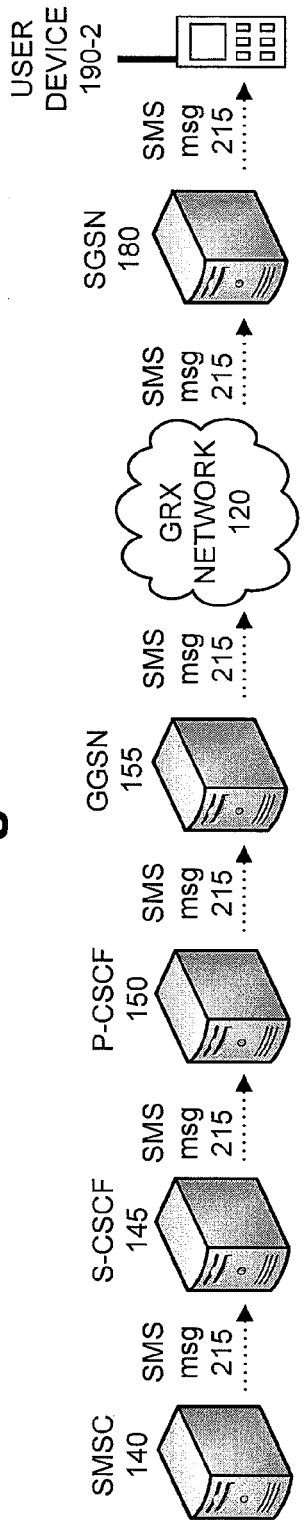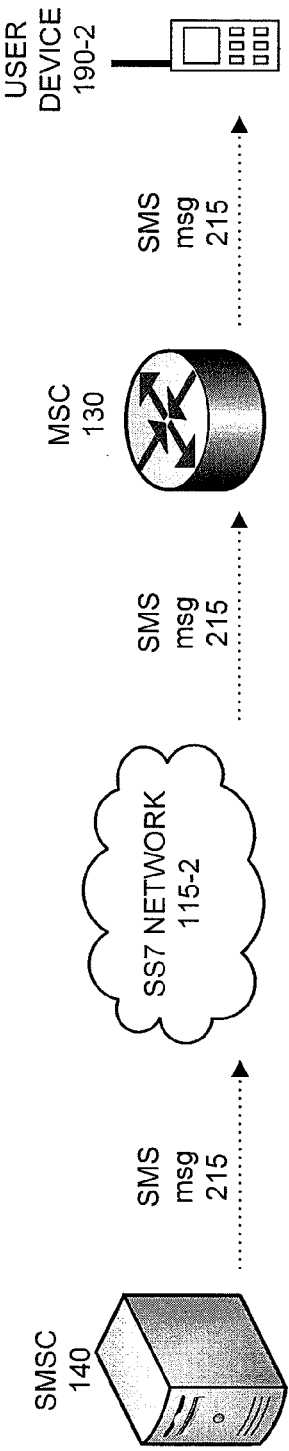

US 8,761,817 B2

SHORT MESSAGING SERVICE DELIVERY ARCHITECTURE IN HYBRID LTE/CDMA/GSM NETWORKS

BACKGROUND

As service and network providers continue to expand network infrastructures, a user is afforded a ubiquitous communication platform to communicate with others. However, when the user may be utilizing certain networks while roaming, some services offered to the user may not be available.

BRIEF DESCRIPTION OF THE DRAWINGS

FIGS. 4A and 4B are diagrams illustrating exemplary implementations for providing user registration information;

FIGS. 5A-5C are diagrams illustrating exemplary network paths for delivery of an SMS message;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

As will be described herein, a user may be afforded certain services (e.g., short messaging service (SMS)) while roaming in, for example, a $2^{nd}$ Generation (2G) network (e.g., a Global System for Mobile communications (GSM) network), when the user's home network may be, for example, a $3^{rd}$ Generation (3G) network or a $4^{th}$ Generation (4G) network (e.g. code division multiple access (CDMA) network or a Long Term Evolution (LTE) network). In one implementation, a SMS center (SMSC) may obtain user registration information, associated with the roaming user and pertaining to the GSM network, based on a single query. For example, in one implementation, the SMSC may query a home subscriber server (HSS) associated with an Internet Protocol (IP) Multimedia Subsystem (IMS) network. The HSS may query a home location register (HLR) associated with the GMS network. In turn, the HSS may pass the user registration information back to the SMSC. The user registration information may pertain to both the IMS network and the GSM network. In another implementation, the HSS and the HLR may be implemented as a centralized database.

Additionally, as will be described herein, when the roaming user is registered in the GSM network and is provided with voice service (or circuit coverage), the SMSC may forward an SMS message to a GSM SMS gateway. The GSM SMS gateway (GW) may serve as a proxy or a home SMSC for the roaming user in the GSM network. The CDMA/GSM SMS GW may transcode, re-format, manage signaling, etc. with respect to the GSM network so that the SMS message may be delivered from the user's home network to the GSM network.

Figure 1:
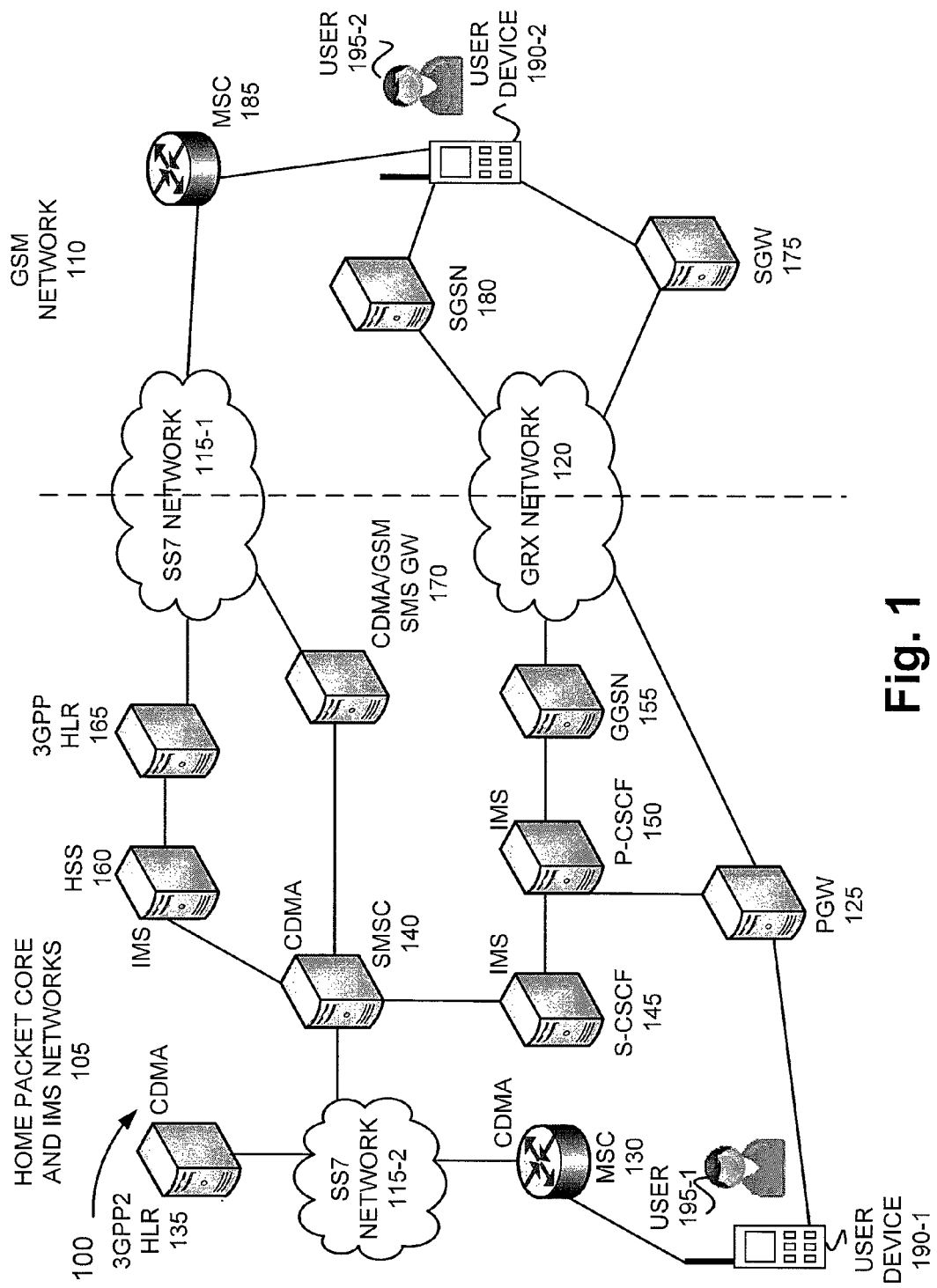
FIG. 1 is a diagram illustrating an exemplary network that provides short messaging service (SMS) to a roaming user according to an exemplary implementation described herein.

FIG. 1 is a diagram illustrating an exemplary network 100 that provides short messaging service (SMS) to a roaming user according to an exemplary implementation as described herein. As illustrated, network 100 may include home packet core network and an IMS network 105 (collectively referred to as a home network 105) and a GSM network 110. In this example, home network 105 and GSM network 110 may be connected via a Signaling System #7 (SS7) network 115-1 and a General Packet Radio Service (GPRS) Roaming Exchange (GRX) network 120. In practice, network 100 may include more, fewer, different, and/or differently arranged devices and/or networks than those illustrated in FIG. 1. Additionally, or alternatively, in other implementations, one or more functions described as being performed by a particular device or network may be performed by a different device or a different network, or some combination thereof. Network 100 may include wired and/or wireless connections between the networks and the devices illustrated. The connections between devices and networks in network 100 are exemplary, and in other implementations, the connections may be different.

As illustrated in FIG. 1, home network 105 may include an SS7 network 115-2, a packet gateway (PGW) 125, a mobile switching center (MSC) 130, an HLR 135, an SMSC 140, a serving-call session control function (S-CSCF) 145, a proxy-CSCF (P-CSCF) 150, a gateway GPRS support node (GGSN) 155, an HSS 160, and an HLR 165. Home network 105 may also include a CDMA/GSM SMS GW 170. As will be described in greater detail, CDMA/GSM SMS GW 170 may provide for delivery of SMS when a user may be roaming in GSM network 110.

As further illustrated in FIG. 1, GSM network 110 may include a signaling gateway (SGW) 175, a serving GPRS support node (SGSN) 180, and an MSC 185. User devices 190-1 and 190-2 (generically referred to as user device(s) 190) may connect to network 100. For example, user devices 190 may correspond to a mobile or a portable device (e.g., a wireless telephone, a personal digital assistant (PDA)) or some other type of communication device. Users 195-1 and 195-2 may be operating user devices 190.

PGW 125 and GGSN 155 may include devices that operate in accordance with the GPRS standard. S-CSCF 145 and P-CSCF 150 may include devices that operate in accordance with the IMS standard. MSC 130, HLR 135, SMSC 140 may include devices that operate in accordance with a wireless network standard (e.g., a $3^{rd}$ Generation Partnership Project 2 (3GPP2)). For example, the wireless network may correspond to a CDMA 2000 network.

HSS 160 may include a device that operates in accordance with the IMS standard. HSS 160 may include a database of subscriber information. HLR 165 may include a device that operates in accordance with a wireless network standard (e.g., 3GPP). For example, HLR 165 may operate according to the GSM standard. CDMA/GSM SMS GW 170 may include a device that acts as a proxy or home SMSC when user device 190 may be roaming in GSM network 110. SMSC 140, HSS 160, HLR 165, and CDMA/GSM SMS GW 170 will be described in greater detail below.

Figure 2:
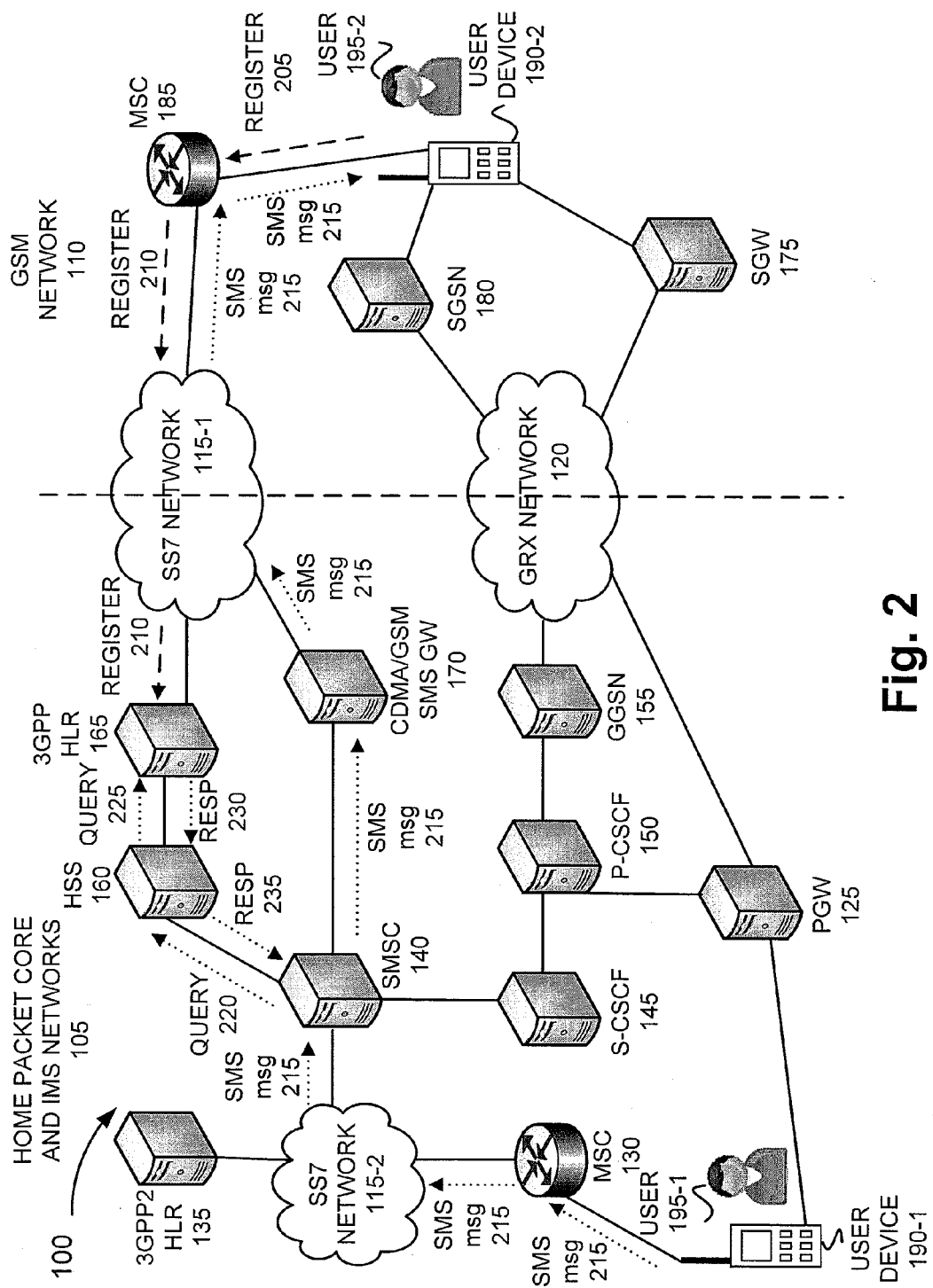
FIG. 2 is a diagram illustrating exemplary operations associated with the network to provide SMS to the roaming user.

FIG. 2 is a diagram illustrating exemplary operations associated with network 100 to provide SMS to the roaming user. As illustrated in FIG. 2, assume user 195-2 is operating user device 190-2 and is roaming in GSM network 110. User 195-2 may register 205 with MSC 185 for voice service (i.e., circuit coverage). MSC 185 may register 210 with HLR 165 via SS7 network 115, so HLR 165 knows which MSC is serving user device 190-2/user 195-2. User device 190-2 may include, for example, a Universal Integrated Circuit Card (UICC), smart card, or the like, to operate in GSM network 110. The UICC may include, among other things, user's 195-2 wireless phone number, and an address of user's 195-2 home SMSC (e.g., CDMA/GSM SMS GW 170).

Additionally, as illustrated in FIG. 2, assume that user 195-1 is operating user device 190-1 and is connected to home network 105. Further assume that user 195-1 decides to send an SMS message 215 to user 195-2. As illustrated, user device 195-1 may send SMS message 215 and SMS message 215 may propagate to SMSC 140 via MSC 130 and SS7 network 115-2.

In this instance, SMSC 140 may need to determine where to forward SMS message 215. In this example, assume that user 195-2 is not registered with the IMS network of home network 105, but is registered in GSM network 110, as previously described. In other examples, user 195-2 may be registered with different and/or additional network(s).

Since SMSC 140 needs to determine where to forward SMS message 215, SMSC 140 may query 220 HSS 160. HSS 160 may determine whether user 195-2 is registered with the IMS network. In this example, given the registration state of user 195-2, HSS 160 may determine that user 195-2 is not registered with the IMS network.

Additionally, in one implementation, in response to query 220, HSS 160 may, in turn, query 225 (or search) HLR 165 to determine whether user 195-2 is registered in GSM network 110. HSS 160 may obtain or receive a response 230 that includes the user registration state information (e.g., user 195-2 is registered with MSC 185 of GSM network 110). In turn, HSS 160 may send a response 235 to SMSC 140. In this example, response 235 may indicate that user 195-2 is not registered in the IMS network of home network 105, but is registered in GSM network 110. For example, response 235 may include a point code (e.g., a network address, such as, an IP address) associated with MSC 185. SMSC 140 may determine that the point code belongs to GSM network 110. Based on response 235, SMSC 140 may forward SMS message 215 to CDMA/GSM SMS GW 170. CDMA/GSM SMS GW 170 may serve or act as a proxy SMSC (e.g., a home SMSC) to user 195-2 when user 195-2 is roaming in GSM network 110. CDMA/GSM SMS GW 170 may perform various communication-related operations (e.g., formatting, transcoding, signaling, etc.) with respect to SMS message 215 before forwarding SMS message 215 to user device 190-2 via SS7 network 115-1 and MSC 185. For example, CDMA/GSM SMS GW 170 may re-format and/or transcode SMS message 215 from a CDMA format to a GSM format. Additionally, for example, CDMA/GSM SMS GW 170 may manage the signaling between home network 105 and GSM network 110.

As a result of the foregoing, users roaming in a 2G network (e.g., a GSM network), with respect to a 3G network (e.g., a CDMA network) may be provided with SMS. This is in contrast to conventional delivery schemes where SMSC 140 may not be able to forward an SMS message when a user is not registered with a home SMSC (of the CDMA network) of home network 105 and the user is not registered with the IMS network of home network 105 (i.e., SMSC 140 may not be able to forward the SMS message via S-CSCF 145). Since implementations have been broadly described, variations to the above implementations will be discussed further below.

Figure 3A:
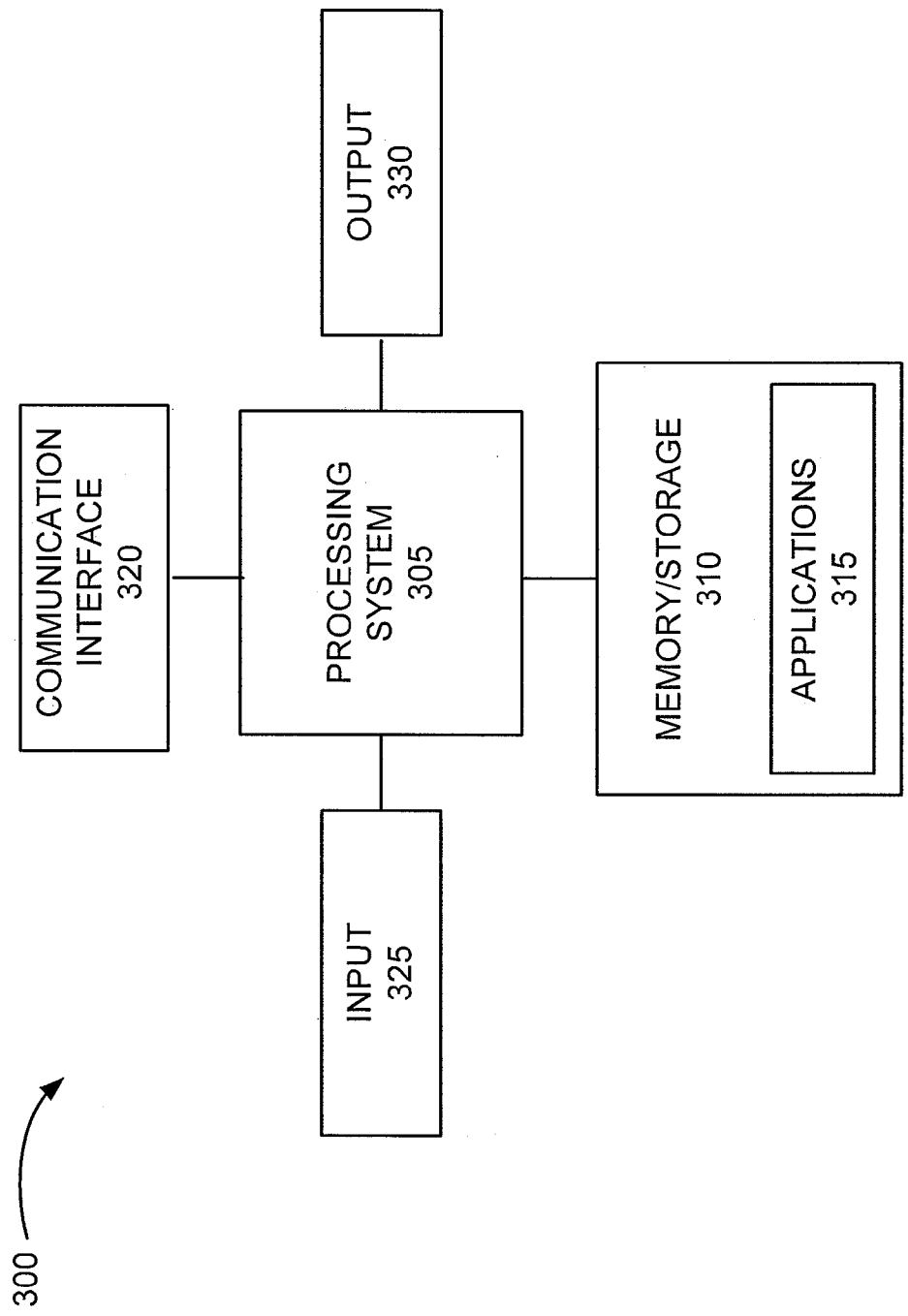
FIG. 3A is a diagram illustrating exemplary components of a device that may correspond to one or more of the devices depicted in FIGS. 1 and 2.

FIG. 3A is a diagram illustrating exemplary components of a device 300 that may correspond to one or more of the devices depicted in FIGS. 1 and 2. For example, device 300 may correspond to PGW 125, MSC 130, HLR 135, SMSC 140, S-CSCF 145, P-CSCF 150, GGSN 155, HSS 160, HLR 165, CDMA/GSM SMS GW 170, SGW 175, SGSN 180, MSC 185, and/or user device 190. As illustrated, device 300 may include a processing system 305, memory/storage 310 including applications 315, a communication interface 320, an input 325, and an output 330. In other implementations, device 300 may include fewer, additional, and/or different components, and/or a different arrangement of components than those illustrated in FIG. 3A and described herein. For example, device 300 may not include secondary storage (e.g., associated with memory/storage 310). Additionally, in other implementations, some functions described as being performed by a particular component may be performed by a different component, or some combination thereof.

Processing system 305 may include one or more processors, microprocessors, data processors, co-processors, network processors, application specific integrated circuits (ASICs), controllers, programmable logic devices (PLDs), chipsets, field programmable gate arrays (FPGAs), and/or some other component that may interpret and/or execute instructions and/or data. Processing system 305 may control the overall operation, or a portion thereof, of device 300, based on, for example, an operating system (not illustrated) and/or various applications (e.g., applications 315). Processing system 305 may access instructions from memory/storage 310, from other components of device 300, and/or from a source external to device 300 (e.g., a network or another device).

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, or the like. A computer-readable medium may correspond to, for example, a physical memory device or a logical memory device. A logical memory device may include memory space within a single physical memory device or spread across multiple physical memory devices.

Memory/storage 310 may store data, application(s), and/or instructions related to the operation of device 300. For example, memory/storage 310 may include applications 315 related to providing communications within home network 105 and/or GSM network 110. Depending on the device to which device 300 corresponds (e.g., a PGW, an MSC, an HLR, an SMSC, an SGS, etc.), applications 315 may correspond to application(s) that are typically included with the particular device in accordance with a communication standard, network architecture, or the like.

Communication interface 320 may permit device 300 to communicate with other devices, networks, and/or systems. For example, communication interface 320 may include some type of wireless and/or wired interface.

Input 325 may permit a user and/or another device to input information into device 300. For example, input 325 may include a keyboard, a button, a switch, a knob, a touchpad, an input port, a display, and/or some other type of input component. Output 330 may permit device 300 to output information to the user and/or another device. For example, output 330 may include a display, light emitting diodes (LEDs), an output port, a speaker, and/or some other type of output component.

As described herein, device 300 may perform certain operations in response to processing system 305 executing software instructions contained in a computer-readable medium, such as memory/storage 310. The software instructions may be read into memory/storage 310 from another computer-readable medium or from another device via communication interface 320. The software instructions contained in memory/storage 310 may cause processing system 305 to perform processes described herein. Alternatively, hardwired circuitry may be used in place of or in combination with software instructions to implement processes described herein. Thus, implementations described herein are not limited to any specific combination of hardware circuitry and software.

Figure 3B:
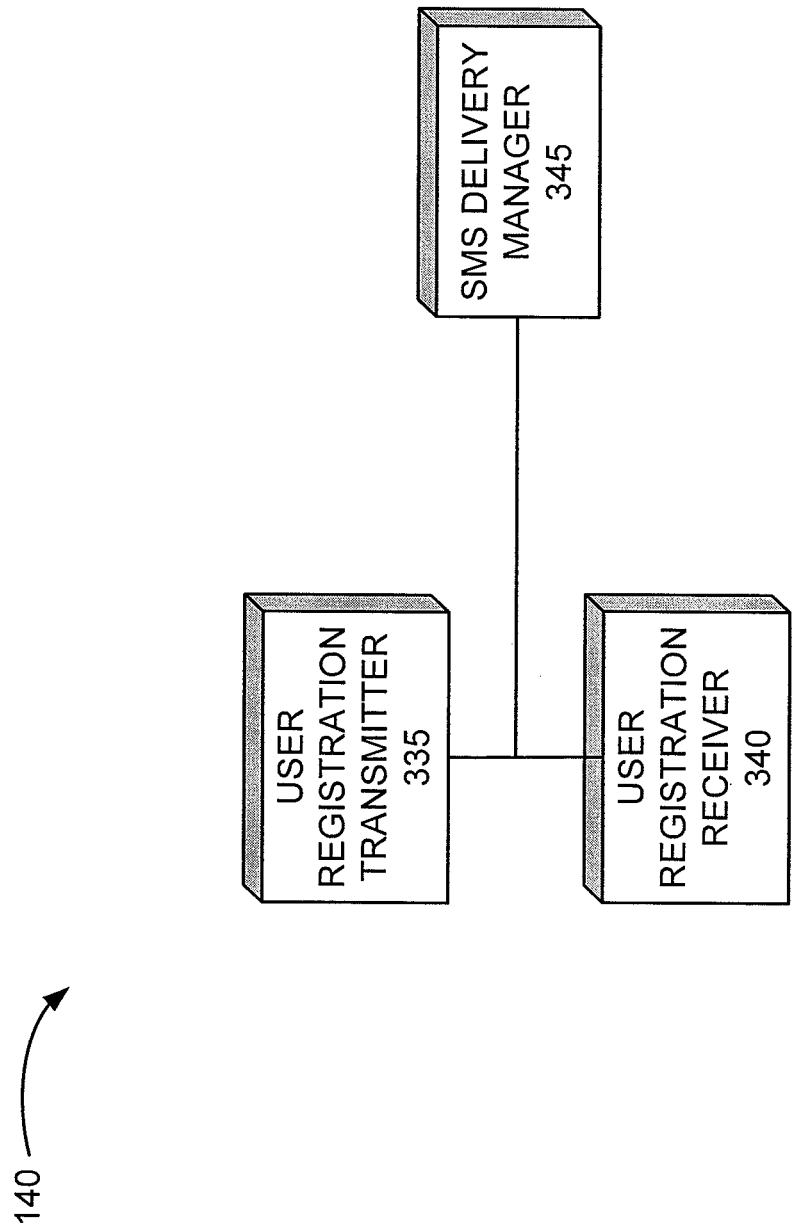
FIG. 3B is a diagram illustrating exemplary functional components associated with a short messaging service center (SMSC) depicted in FIGS. 1 and 2.

FIG. 3B is a diagram illustrating exemplary functional component associated with SMSC 140. As illustrated in FIG. 3B, SMSC 140 may include a user registration transmitter (URT) 335, a user registration receiver (URR) 340, and an SMS delivery manager (SMSDM) 345. URT 335, URR 340, and/or SMSDM 345 may be implemented as a combination of hardware and software based on the components illustrated and described with respect to FIG. 3A. Alternatively, URT 335, URR 340, and/or SMSDM 345 may be implemented as hardware based on the components illustrated and described with respect to FIG. 3A.

URT 335 may generate and send queries to obtain user registration information. For example, as previously described, SMSC 140 (e.g., URT 335) may generate query 220 to determine whether user 195-2 is registered with the IMS network of home network 105 and/or GSM network 110. URT 335 may also generate a query to HLR 135 to determine whether user 195-2 is registered in the CDMA network of home network 105. As will be described below, a number of queries generated and sent and an order in which queries may be generated and sent may depend on a user registration state of a user and/or whether an SMS message is delivered successfully.

URR 340 may receive and process responses to queries for user registration information. For example, as previously described, SMSC 140 (e.g., URR 340) may receive response 235. Response 235 may indicate which, if any, networks (e.g., IMS network of home network 105 or GSM network 110), user 195 may be registered. URR 340 may also receive and process a response from HLR 135, which may indicate whether user 195-2 is registered with the CDMA network of home network 105. As will be described below, depending on the user registration state, URR 340 may direct SMSDM 345 to deliver an SMS message along a network path corresponding to a network with which a user may be registered and/or direct URT 335 to generate and send a query.

SMSDM 345 may delivery an SMS message to a user based on the user registration state. For example, as previously described, SMSC 140 (e.g., SMSDM 345) may deliver SMS message 215 along a GSM network path when it is known that user 195-2 is registered with GSM network 110. As will be described below, SMSDM 345 may deliver an SMS message along a particular network path in correspondence to a user's registration state.

Although FIG. 3B illustrates an exemplary functional component of SMSC 140, in other implementations, SMSC 140 may include fewer, additional, different, and/or a different arrangement of functional components than those illustrated and described with respect to FIG. 3B. Additionally, or alternatively, one or more operations described as being performed by a particular functional component may be performed by one or more other functional components, in addition to or instead of the particular functional component.

Figure 4B:
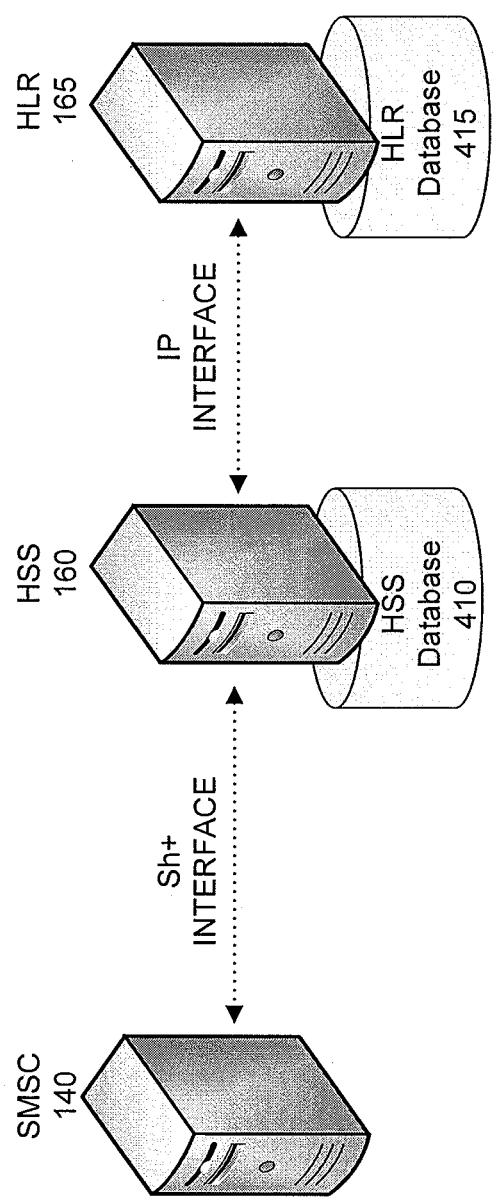

In one implementation, HSS 160 and HLR 165 may correspond to a centralized database. In another implementation, HSS 160 and HLR 165 may correspond to separate databases. FIGS. 4A and 4B are diagrams illustrating exemplary implementations for providing user registration information. FIG. 4A is a diagram illustrating an exemplary implementation when HSS 160 and HLR 165 correspond to a centralized database, and FIG. 4B is a diagram illustrating an exemplary implementation when HSS 160 and HLR 165 correspond to separate databases.

As illustrated in FIG. 4A, HSS 160 and HLR 165 may form a centralized database 405. SMSC 140 may communicate with centralized database 405 via a modified Sh interface (e.g., illustrated as an Sh+ interface). Typically, the Sh interface is utilized in an IMS network to provide communication with an HSS (e.g., HSS 160). However, since SMSC 140 may query centralized database 405 for GSM registration information, the Sh interface may be modified. Under this framework, SMSC 140 may communicate (e.g., query 220) centralized database 405 via Sh+ interface and receive both IMS user registration information and GSM user registration information.

As illustrated in FIG. 4B, HSS 160 and HLR 165 may form separate databases (e.g., an HSS database (DB) 410 and an HLR DB 415). In this implementation, an additional interface (e.g., an IP interface) may be added to permit HSS 160 to query HLR 165 for GSM registration information.

Although FIGS. 4A and 4B illustrate exemplary implementations for providing user registration information, in other implementations, additional, fewer, different, and/or a different arrangement of components may be utilized.

As previously described, when SMSC 140 determines which network a user device (e.g., user device 190-2) is registered, SMSC 140 may forward SMS message 215 along the a network path corresponding to the network to which the user device is registered. While in the example discussed above in FIG. 2, user 195-2 was registered only with GSM network 110, in other instances, user 195-2 may be registered with more than one network (e.g., the CDMA network, the IMS network, and/or the GSM network). Thus, in some instances, SMSC 140 may have to select one network over another network, when SMSC 140 learns that more than one network is available to forward SMS message 215 to user 195-2.

FIGS. 5A-5C are diagrams illustrating exemplary network paths for delivery of SMS message 215. As illustrated in FIG. 5A, and previously described in FIG. 2, when SMS message 215 is forwarded along a GSM network path, SMSC 140 may forward SMS message 215 to user device 190-2 via CDMA/GSM SMS GW 170, SS7 network 115-1, and MSC 185. Referring to FIG. 5B, when SMS message 215 is forwarded along an IMS network path, SMSC 140 may forward SMS message 215 to user device 190-2 via S-SCSF 145, P-CSCF-150, GGSN 155, GRX network 120, and SGSN 180.

In the instance that SMSC 140 learns from centralized database 405 or HSS 160, based on response 235, that user 195-2 is registered in both GSM network 110 and the IMS network of home network 105, SMSC 140 (e.g., URR 340) may select either a GSM network path or an IMS network path to forward SMS message 215. URR 340 may direct SMSDM 345 to deliver SMS message 215 along the selected network path. Additionally, in the event that SMS message 215 is not successfully delivered on the selected path, SMSC 140 (e.g., SMSDM 345) may forward SMS message 215 along the other available network path. In one implementation, SMSC 140 (e.g., URR 340) may select the IMS network path first (to deliver SMS message 215) since the GSM network path may include format conversion, transcoding, etc., which may be performed by CDMA/GSM SMS GW 170, and concomitant to which, may increase latency and impact quality of service (QOS), etc., with respect to the delivery of SMS message 215 to user 195-2.

In the instance that SMSC 140 learns from centralized database 405 or HSS 160, based on response 235, that user 195-2 is registered in only one of GSM network 110 or the IMS network of home network 105, SMSC 140 may select the network path in which user 195-2 is registered and attempt to deliver SMS message 215. In the event that SMS message 215 is not successfully delivered, in one implementation, SMSC 140 (e.g., URT 335) may initiate a query to HLR 135 to determine whether user 195-2 is registered in the CDMA network of home network 105. Additionally, in the instance that SMSC 140 (e.g., URR 340) learns from centralized database 405 or HSS 160, based on response 235, that user 195-2 is not registered in either of GSM network 110 or the IMS network, SMSC 140 (e.g., URT 335) may initiate a query to HLR 135 to determine whether user 195-2 is registered in the CDMA network.

In either of these instances, if user 195-2 is registered in the CDMA network of home network 105, SMSC 140 (e.g., SMSDM 345) may forward SMS message 215 along a CDMA network path. FIG. 5C is a diagram illustrating SMS message 215 being delivered along an exemplary CDMA network path. In this example, assume SMSC 140 may be the home SMSC for user 195-2 and user 195-2 may be registered with MSC 130. In other instances, this may not be the case, and SMSC 140 may need to determine which SMSC and/or MSC with which user 195-2 is registered. In this example, however, SMSC 140 may determine user 195-2 is registered with MSC 130. As illustrated in FIG. 5C, when SMS message 215 is forwarded along the CDMA network path, SMSC 140 may forward SMS message 215 to user device 190-2 via SS7 network 115-2 and MSC 130. In the instance that user 195-2 is not registered in the CDMA network, SMSC 140 may indicate a delivery failure and/or query centralized database 405, HSS 160 and/or HLR 135 again.

While, in one implementation, it has been described that SMSC 140 (e.g., URT 335) queries centralized database 405 or HSS 160 (to learn whether user 195-2 is registered with GMS network 110 and/or the IMS network of home network 105) before querying HLR 135 (to learn whether user 195-2 is registered with the CDMA network of home network 105), in other implementations, SMSC 140 may query HLR 135 before querying centralized database 405 or HSS 160. Still, in another implementation, SMSC 140 may query both HLR 135 and (HSS 160 or centralized database 405) simultaneously.

Figure 6A:
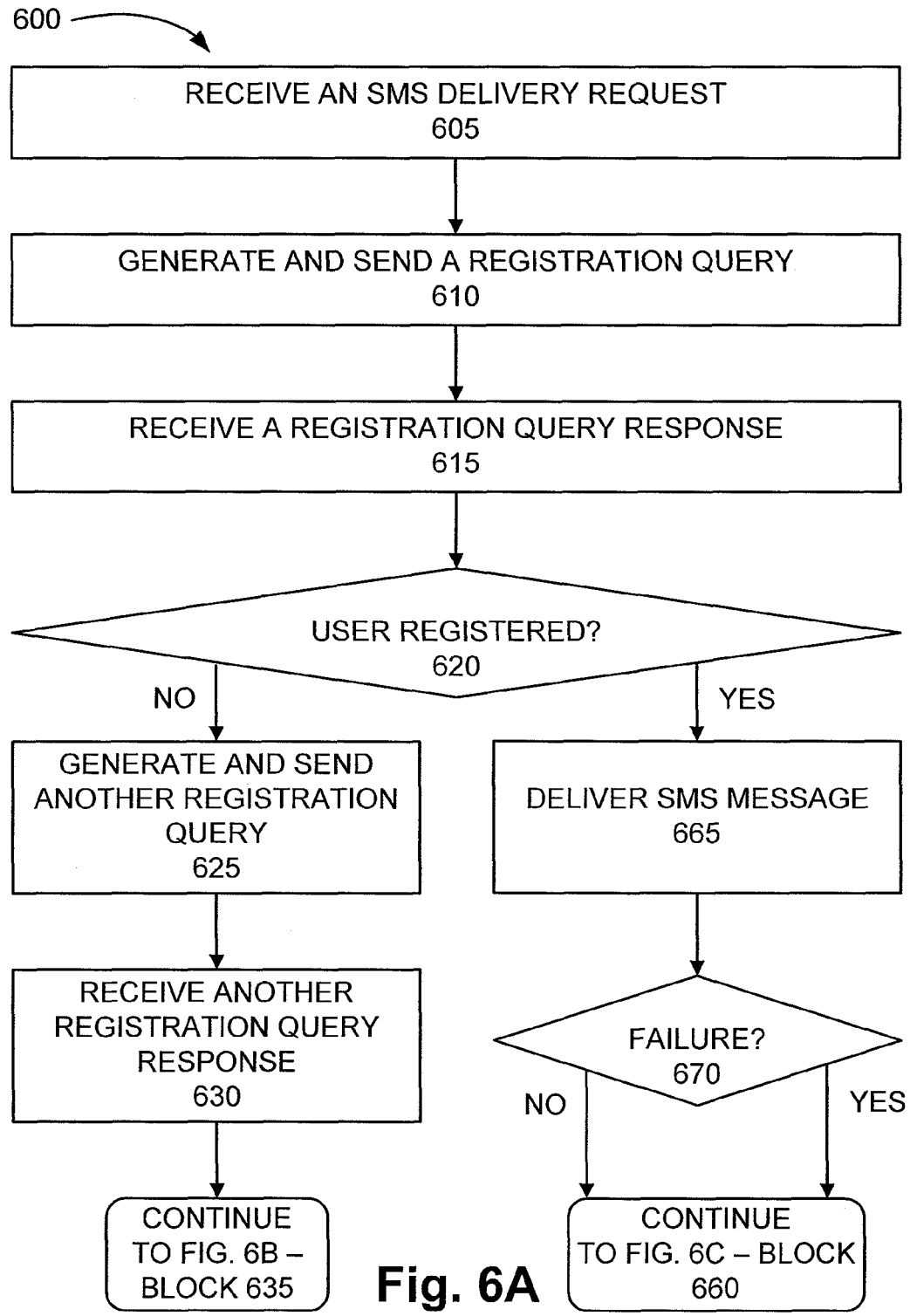
FIGS. 6A-6C are flow diagrams illustrating an exemplary process for forwarding an SMS message to the roaming user.
Figure 6B:
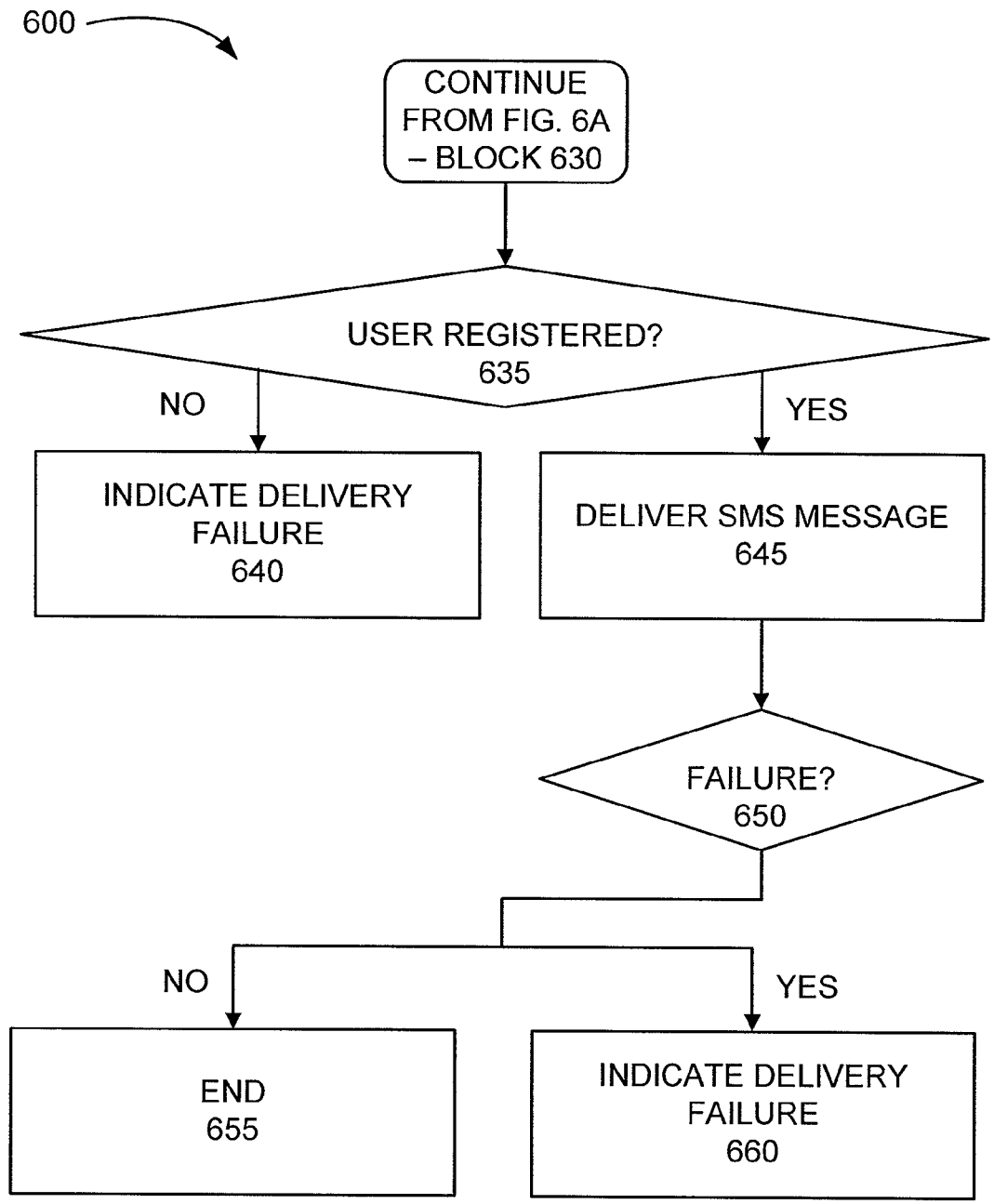
Figure 6C:
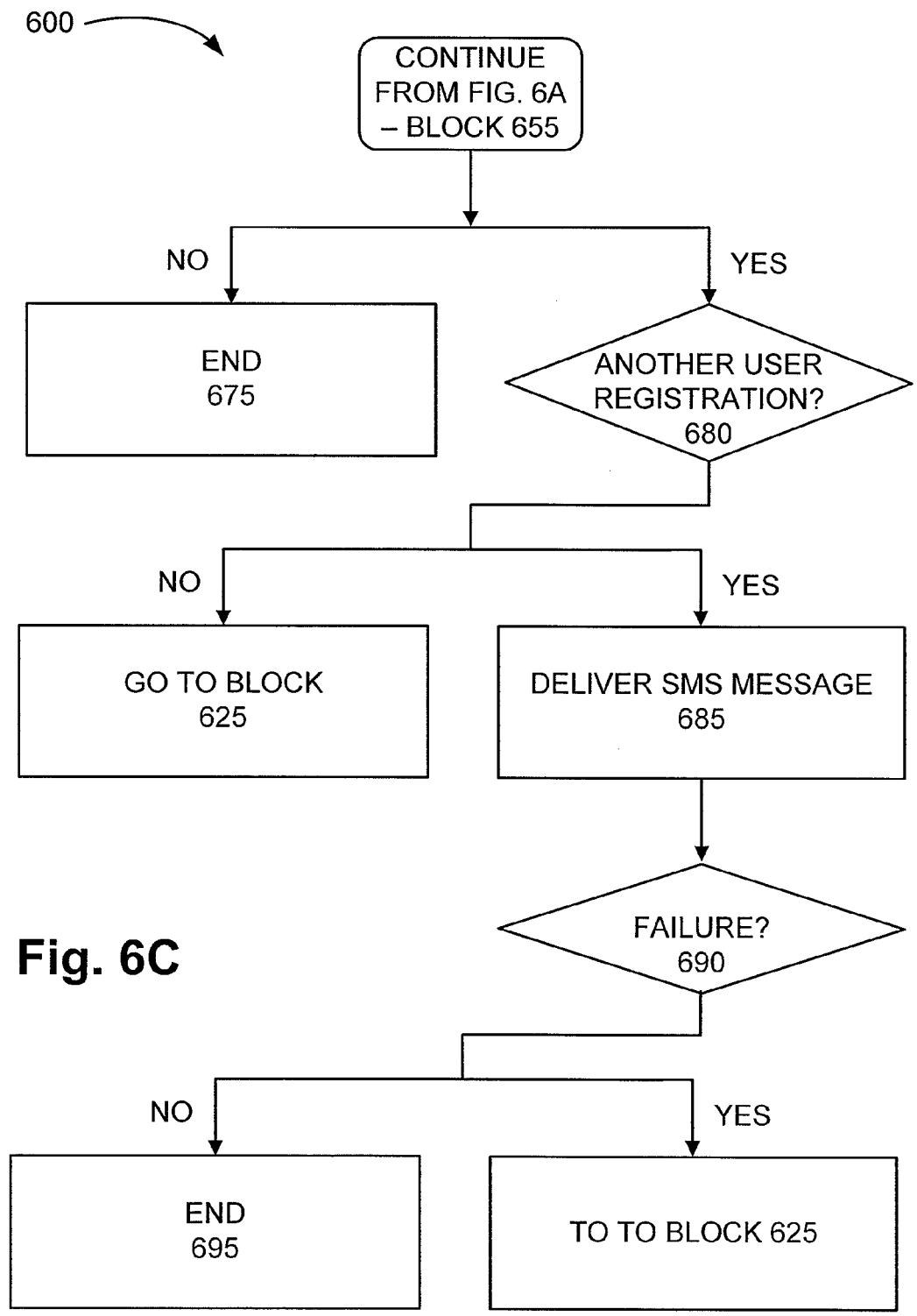

FIGS. 6A-6C illustrate flow diagrams of an exemplary process 600 for providing SMS to a roaming user. In one implementation, process 600 may be performed by SMSC 140. In another implementation, some or all of process 600 may be performed by another device or group of devices, including or excluding SMSC 140.

Process 600 may include receiving an SMS delivery request (block 605). For example, as previously described, SMSC 140 may receive an SMS message (e.g., SMS 215), which originates from a user (e.g., user 195-1), that is to be delivered to another user (e.g., user 195-2). The other user may be roaming in a GSM network (e.g., GSM network 110).

A registration query may be generated and sent (block 610). For example, as previously described, in one implementation, SMSC 140 (e.g., URT 335) may first send query 220 to HSS 160 (or centralized database 405). In another implementation, SMSC 140 may first send a query to HLR 135. Alternatively, SMSC 140 may send queries to both HSS 160 (or centralized database 405) and HLR 135 simultaneously. However, for purposes of discussion, process 600 will be described that SMSC 140 first sends query 220 to HSS 160 (or centralized database 405).

A registration query response may be received (block 615). For example, as previously described, SMSC 140 (e.g., URR 340) may receive a response 235 from HSS 160 (or centralized database 405).

It may be determined whether a user is registered (block 620). For example, as previously described, SMSC 140 (e.g., URR 340) may determine whether user 195-2 is registered with the IMS network of home network 105 and/or GSM network 110, based on response 235.

Figure 7:
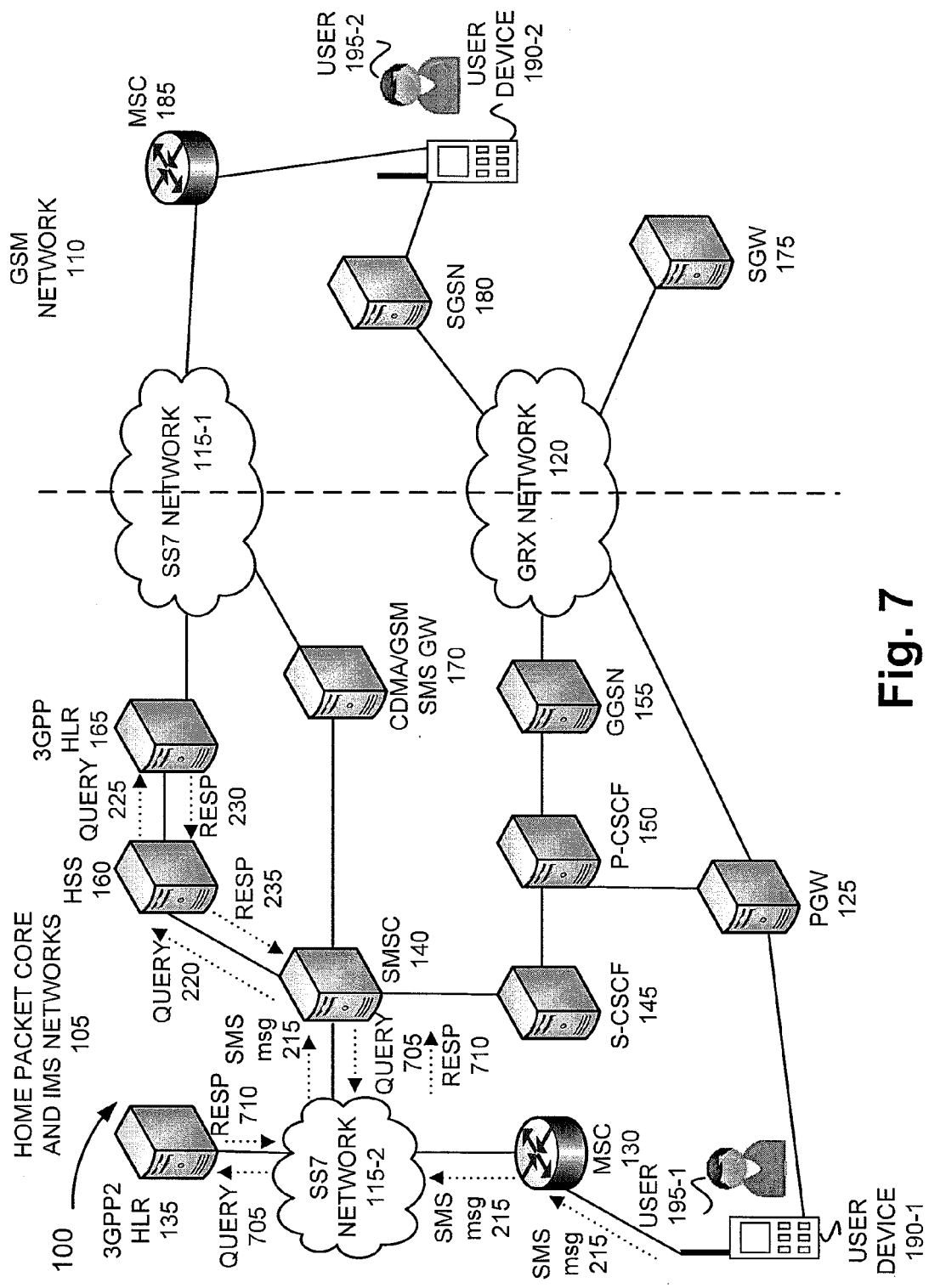
FIG. 7 is a diagram illustrating exemplary operations associated with the network to provide SMS to the roaming user.

If it is determined that the user is not registered (block 620—NO), another registration query may be generated and sent (block 625). For example, as previously described, in the instance that user 195-2 is not registered with either the IMS network of home network 105 or GSM network 110, in one implementation, SMSC 140 (e.g., URT 335) may generate and send a query 705 to HLR 135, via SS7 network 115-2, as illustrated in FIG. 7.

Referring back to FIG. 6A, another registration query response may be received (block 630). For example, HLR 135 may send a response 710 back to SMSC 140, via SS7 network 115-2.

Referring to FIG. 6B, it may be determined whether the user is registered (block 635). For example, as previously described, SMSC 140 (e.g., URR 340) may determine whether user 195-2 is registered with the CDMA network of home network 105. In one example, as illustrated in FIG. 7, SMSC 140 may provide a query 705 to HLR 135 via SS7 115-2. HLR 135 may provide a response 710 to SMSC 140 via SS7 115-2.

If it is determined that the user is not registered (block 635—NO), a delivery failure may be indicated (block 640). For example, SMSC 140 may indicate to user 195-1 that SMS message 215 was not delivered.

If it is determined that the user is registered (block 635—YES), an SMS message may be delivered (block 645). For example, as previously described, if user 195-2 is registered with the CDMA network of home network 105, SMSC 140 (e.g., SMSDM 345) may forward SMS message 215 via an MSC with which user 195-2 is registered.

It may be determined whether the delivery of the SMS message is successful (block 650). For example, SMSC 140 may receive an acknowledgement and/or some other indication whether SMS message 215 is delivered to user 195-2. If it is determined that the delivery of the SMS message is successful (i.e., does not fail) (block 650—NO), process 600 may end (block 655). If it is determined that the delivery of the SMS message is not successful (i.e., fails) (block 650—YES), a delivery failure may be indicated (block 660). For example, SMSC 140 may indicate to user 195-1 that SMS message 215 was not delivered and/or make another attempt to deliver SMS message 215 to user 195-2 utilizing the CDMA network path.

Referring back to FIG. 6A, if it is determined that the user is registered (block 620—YES), the SMS message may be delivered (block 665). For example, as previously described, user 195-2 may be registered with the IMS network of home network 105 and/or GSM network 110. In the instance that user 195-2 is registered with both the IMS network and GSM network 110, as previously described, SMSC 140 (e.g., URR 340) may select which of the IMS network or GSM network 110 to utilize first. In one implementation, SMSC 140 may select the IMS network first since the GSM network path may include format conversion, transcoding, etc., which may be performed by CDMA/GSM SMS GW 170, and may increase latency and impact QOS, etc., with respect to the delivery of SMS message 215 to user 195-2.

It may be determined whether the delivery of the SMS message is successful (block 670). For example, SMSC 140 may receive an acknowledgement and/or some other indication whether SMS message 215 is delivered to user 195-2.

Referring to FIG. 6C, if it is determined that the delivery of the SMS message is successful (i.e., does not fail) (block 670—NO), process 600 may end (block 675). If it is determined that the delivery of the SMS message is unsuccessful (i.e., fails) (block 670—YES), it may be determined whether the user is registered with another network (block 680). For example, in the instance that user 195-2 is registered with both the IMS network of home network 105 and GSM network 110, SMSC 140 (e.g., URR 340 and/or SMSDM 345) may recognize that another network path to delivery SMS message 215 is available.

If it is determined that the user is not registered with another network (block 680—NO), process 600 may continue to block 625. For example, as previously described, in one implementation, if response 235 indicates that user 195-2 is registered only with the IMS network of home network 105 or GSM network 110, SMSC 140 (e.g., URT 335) may query HLR 135, as described in block 625 of process 600.

If it is determined that the user is registered with another network (block 680—YES), the SMS message may be delivered (block 685). For example, SMSC 140 (e.g., URR 340 and/or SMSDM 345) may select the other one of the two networks (IMS network of home network 105 or GSM network 110). In one implementation, as previously described, if SMSC 140 selected the IMS network (in block 665) to deliver SMS message 215 to user 195-2, SMSC 140 may now select GSM network 110 to deliver SMS message 215 to user 195-2.

It may be determined whether the delivery of the SMS message is successful (block 690). For example, SMSC 140 may receive an acknowledgement and/or some other indication whether SMS message 215 is delivered to user 195-2. If it is determined that the delivery of the SMS message is successful (i.e., does not fail) (block 690—NO), process 600 may end (block 695). If it is determined that the delivery of the SMS message is not successful (i.e., fails) (block 690—YES), process 600 may continue to block 625. For example, as previously described, in one implementation, if SMSC's 140 attempts to deliver SMS message 215 via the IMS network of home network 105 and GSM network 110 fail, SMSC 140 may query HLR 135, as described in block 625 of process 600.

Although FIGS. 6A-6C illustrate an exemplary process 600, in other implementations, additional, fewer, and/or different operations than those described, may be performed. For example, as previously described, SMSC 140 may query HLR 125 before HSS 160 (or centralized database 405). Alternatively, SMSC 140 may simultaneously query HLR 125 and HSS 160 (or centralized database 405). In the instance that the user is registered with more than one network, SMSC 140 (e.g., URR 340) may select an appropriate a network order in which SMS message 215 is to be delivered.

Figure 8:
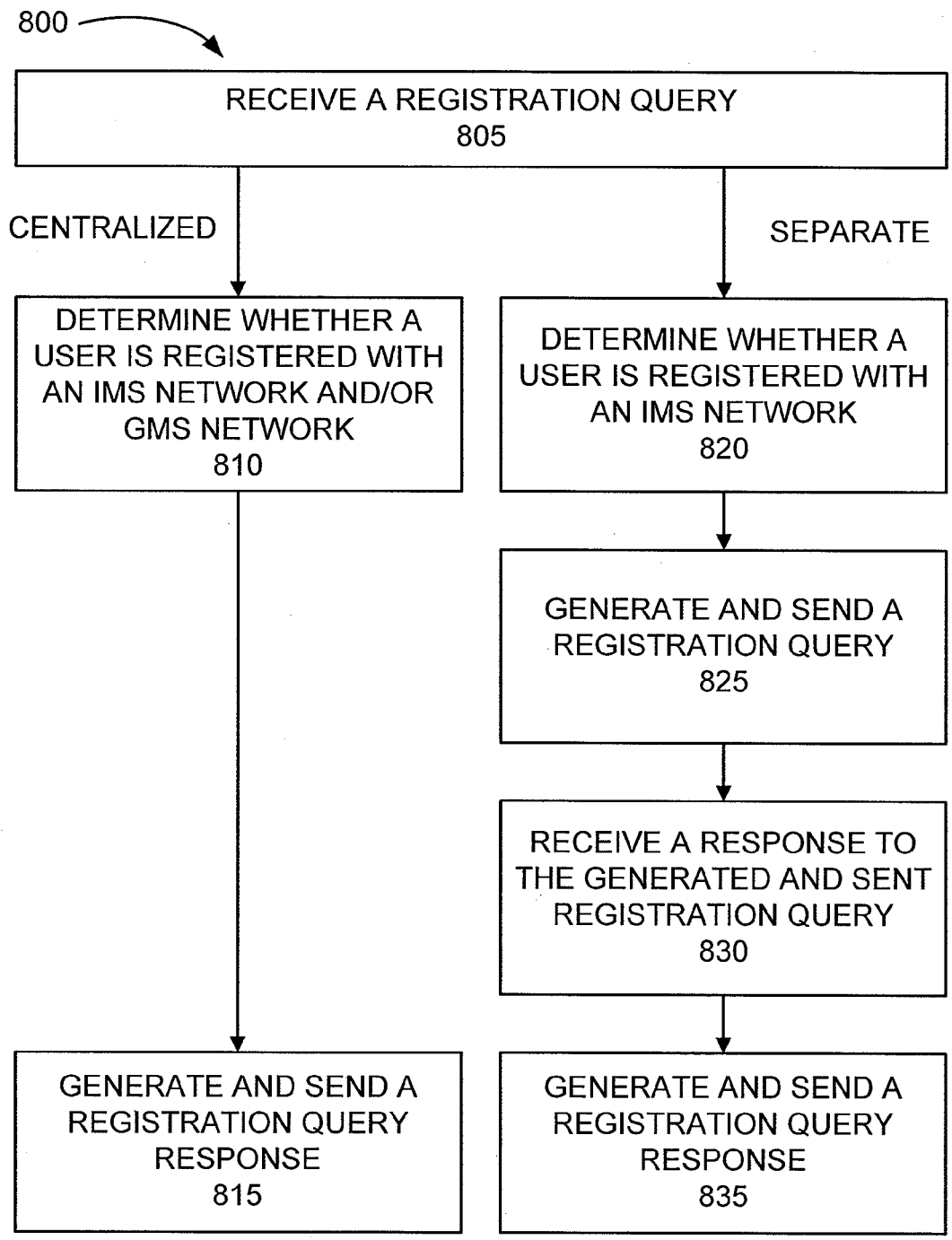
FIG. 8 is a flow diagram illustrating an exemplary process for providing user registration information.

As previously described with respect to FIGS. 4A and 4B, as well as elsewhere in this description, HSS 160 and HLR may be implemented as a centralized database (e.g., centralized database 405) or separate databases (e.g., HSS database 410 and HLR database 415). FIG. 8 is a flow diagram illustrating exemplary processes 800 for providing user registration information. Process 800 may be performed by centralized database 405 (e.g., HSS 160 and HLR 165) or by HSS 160 (e.g., when HSS 160 and HLR 165 are separate databases), as illustrated in FIGS. 4A and 4B.

Referring to FIG. 8, process 800 may include receiving a registration query (block 805). For example, as previously described, SMSC 140 may send a query 220. Centralized database 405 or HSS 160 may receive query 220.

When HSS 160 and HLR 165 are implemented as centralized database 405, it may be determined whether a user is registered with an IMS network and/or a GMS network (block 810). For example, as previously described, centralized database 405 may identify whether a user (e.g., user 195-2) is registered with the IMS network of home network 105, GMS network 110, or both.

A registration query response may be generated and sent (block 815). For example, as previously described, centralized database 405 (e.g., HSS 160) may generate and send a response 235 to SMSC 140 to indicate whether the user (e.g., user 195-2) is registered with the IMS network of home network 105, GMS network 110, or both.

When HSS 160 and HLR 165 are implemented as separate databases, it may be determined whether a user is registered with an IMS network (block 820). For example, HSS database 410 may indicate whether a user (e.g., user 195-2) is registered with the IMS network of home network 105.

A registration query may be generated and sent (block 825). For example, as previously described, HSS 160 may generate and send a query to HLR 165 to determine whether the user is registered with GSM network 110.

A response to the generated and sent registration query may be received (block 830). For example, HSS 160 may receive a response from HLR 165 that indicates whether the user is registered with GSM network 110.

A registration query response may be generated and sent (block 835). For example, HSS 160 may generate and send a response 235 to SMSC 140 to indicate whether the user is registered with the IMS network of home network 105, GMS network 110, or both.

Although FIG. 8 illustrates an exemplary process 800, in other implementations, additional, fewer, and/or different operations than those described, may be performed.

While this description has discussed the delivery of an SMS message from user 195-1 to user 195-2, network 100 may provide for the delivery of an SMS message from user 195-2 to user 195-1.

Figure 9:
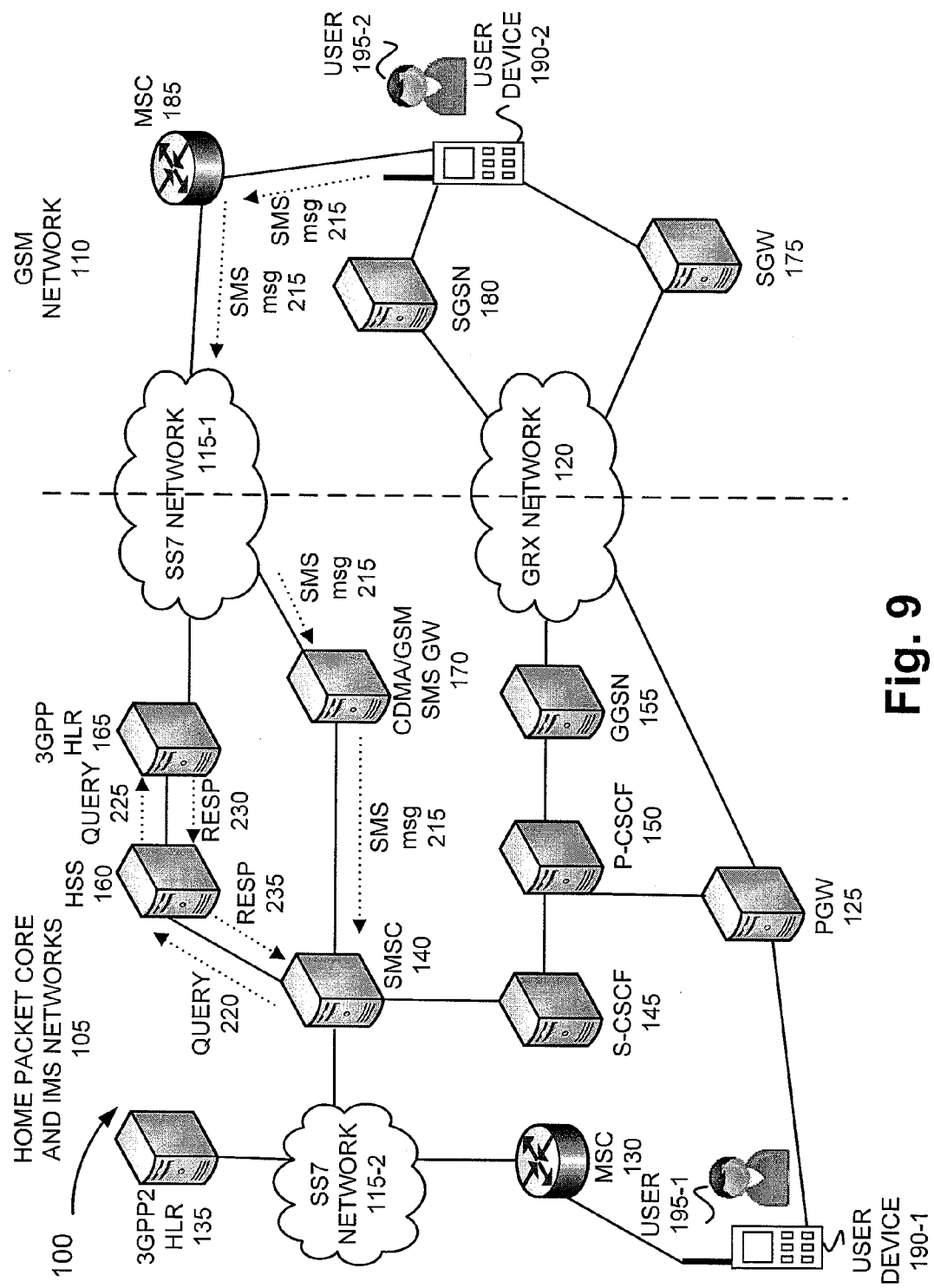
FIG. 9 is a diagram illustrating exemplary operations associated with the network to provide SMS to the roaming user.

FIG. 9 is a diagram illustrating exemplary operations associated with network 100 to provide SMS to the roaming user. As illustrated in FIG. 9, assume user 195-2 is operating user device 190-2 and roaming in GSM network 110. As previously described, user device 190-2 may include, for example, a UICC, smart card, or the like, to operate in GSM network 110. The UICC may include, among other things, user's 195-2 wireless phone number, and an address of user's 195-2 home SMSC (e.g., CDMA/GSM SMS GW 170).

In this example, assume user 195-2 wishes to send SMS message 215 to user 195-1. As illustrated, user device 190-2 may send SMS message 215 and SMS message 215 may propagate to SMSC 140 via MSC 185, SS7 network 115-1, and CDMA/GSM SMS GW 170. SMS message 215 may propagate to CDMA/GSM SMS GW 170 since CDMA/GSM SMS GW 170 may act as a home SMSC for user 195-2, which may be known by MSC 185 when user 195-2 registered with GSM network 110 (e.g., based on the UICC of user device 190-2). CDMA/GSM SMS GW 170 may forward SMS message 215 to SMSC 140, and SMSC 140 may obtain user registration information with respect to user 195-1, in a manner previously described. SMSC 140 may forward SMS message 215 to user 195-1 via an IMS network path or a CDMA network path.

The foregoing description of implementations provides illustration, but is not intended to be exhaustive or to limit the implementations to the precise form disclosed. Accordingly, modifications to the implementations described herein may be possible. For example, although home network 105 has been described as including a 3G network (e.g., a CDMA network), in other implementations, home network 105 may include a 4G network (e.g., an LTE network), in addition to, or instead of a 3G network. In such instances, the functionality described with respect to SMSC 140 may be implemented in a network element associated with the 4G network (e.g., a mobility management entity (MME)), or some combination of devices in the 4G network.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 6A-6C and FIG. 8, the order of the blocks may be modified in other implementations. Further, non-dependent blocks may be performed in parallel.

It will be apparent that devices, methods, and/or systems, described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:
    receiving a request, by a network device and from a user, to deliver a short messaging service (SMS) message, to another user, wherein the other user is roaming;
    sending, to a first device and by the network device, a user registration query;
    receiving, from the first device and by the network device, a user registration response, wherein the user registration response indicates whether the other user, in which the SMS message is to be delivered, is registered with zero networks, one network, or two networks;
    forwarding, by the network device, the SMS message associated with the request, via at least one of the one network or the two networks, when the user registration response indicates that the other user is registered with at least one of the one network or the two networks; and
    sending to a second device, by the network device, another user registration query, when the user registration response indicates that the other user is registered with zero networks.

2. The method of claim 1, wherein the network device resides in a home network associated with the other user, the network device corresponding to an SMS center (SMSC) device of a code division multiple access (CDMA) network, and the first device corresponding to a home subscriber server (HSS).

3. The method of claim 2, wherein the two networks correspond to a Global System for Mobile communications (GSM) network and an Internet Protocol Multimedia Subsystem (IMS) network, and the one network corresponds to the GSM network or the IMS network, and wherein the other user is roaming in the GSM network, and wherein the forwarding comprises:
    selecting the IMS network to forward the SMS message before selecting the GSM network to forward the SMS message, when the user registration response indicates that the other user is registered with both the IMS network and the GSM network;
    omitting to forward the SMS message along the GSM network when a delivery of the SMS message is successful along the IMS network; and
    forwarding the SMS message along the GSM network when the delivery of the SMS message is not successful along the IMS network.

4. The method of claim 2, wherein the two networks correspond to a Global System for Mobile communications (GSM) network and an Internet Protocol Multimedia Subsystem (IMS) network, and the one network corresponds to the GSM network or the IMS network, and wherein the other user is roaming in the GSM network, the method further comprising:
    querying, by the HSS, a home location register (HLR) associated with the GSM network; and
    receiving, by the HSS, a response from the HLR, the response indicating whether the other user is registered with the GSM network; and wherein the user registration response indicates whether the other user is registered with the IMS network and/or the GSM network.

5. The method of claim 4, wherein when the other user is registered with the GSM network, the forwarding comprises:
    forwarding the SMS message to the other user via a GSM SMS gateway of the home network.

6. The method of claim 1, further comprising:
    determining whether the forwarding of the SMS message to the other user was successful; and
    sending, to the second device, the other user registration query, when the forwarding of the SMS message to the other user was not successful.

7. The method of claim 6, wherein the network device resides in a home network associated with the other user, the network device corresponding to an SMS center (SMSC)

device of a code division multiple access (CDMA) network, and the second device corresponds to a home location register (HLR) associated with the CDMA network.

8. The method of claim 7, further comprising:
receiving from the second device, another user registration response; and
forwarding the SMS message, via the CDMA network of the home network, when the other user registration response indicates that the other user is registered with the CDMA network.

9. The method of claim 8, wherein the user registration query indicates that the other user is registered with at least one of the one network or the two networks.

10. A device comprising:
one or more memories to store instructions; and
one or more processors to execute the instructions in the one or more memories to:
receive a request to deliver a short messaging service (SMS) message;
send a user registration query to a first network device;
receive a user registration response from the first network device;
identify whether the user is registered in zero networks, one network, or two networks, based on the user registration response;
forward the SMS message via the one network or at least one of the two networks when the user registration response indicates that the user is registered in the one network or the two networks; and
send another user registration query to a second network device when the user registration response indicates the user is registered in zero networks.

11. The device of claim 10, wherein the device comprises a SMS center (SMSC) associated with a home network of the user, the SMSC being associated with a code division multiple access (CDMA) network of a $3^{rd}$ generation (3G) network.

12. The device of claim 11, wherein the two networks correspond to a Global System for Mobile communications (GSM) network and an Internet Protocol Multimedia Subsystem (IMS) network, and the one network corresponds to the GSM network or the IMS network.

13. The device of claim 12, wherein when the user is registered with the GSM network, the one or more processors are to execute the instructions to:
identify a proxy SMSC associated with the user based on the user registration response; and
forward the SMS message, via the proxy SMSC associated with the home network, to the user in the GSM network.

14. The device of claim of claim 12, wherein the one or more processors are to execute the instructions to:
receive another user registration response from the second network device, wherein the second network device corresponds to a home location register associated with the CDMA network; and
forward the SMS message via the CDMA network to the user.

15. The device of claim 10, wherein the other user registration query is sent when the SMS message is not successfully delivered via the one network or via the two networks.

16. The device of claim 10, wherein the first network device corresponds to a home subscriber server (HSS) associated with an Internet Protocol Multimedia Subsystem (IMS) network, and the device further comprises:
an interface capable of receiving from the first network device, user registration information associated the IMS network and user registration information associated with a Global System for Mobile communications (GSM) network.

17. A network device comprising:
one or more memories to store instructions; and
one or more processors to execute the instructions in the one or more memories to:
receive a user registration query;
identify, in response to the user registration query, whether a user is registered with the network device;
generate and send a query to another network device to determine whether the user is registered with the other network device;
receive a response to the query that indicates whether the user is registered with the other network device; and
send a response to the user registration query that indicates whether the user is registered with zero networks, the network device, the other network device, or both the network device and the other network device.

18. The network device of claim 17, wherein the network device comprises a home subscriber server (HSS) associated with an Internet Protocol Multimedia Subsystem (IMS) network and the other network device comprises a home location register (HLR) associated with a Global System for Mobile communications (GSM) network, wherein the network device further comprises:
an interface to communicate with the other network device.

19. The network device of claim 18, wherein the network device comprises:
an interface to send the response to a short messaging service center (SMSC) associated with a code division multiple access (CDMA) network.

20. A network device comprising:
one or more memories to store instructions; and
one or more processors to execute the instructions in the one or more memories to:
receive a user registration query;
identify whether a user is registered with a first network, the first network corresponding to a home network of the user;
identify whether the user is registered with a second network, the second network corresponding to a network outside of the home network; and
send a response to the user registration query that indicates whether the user is registered in zero networks, the first network, the second network, or both the first network and the second network.

* * * * *